United States Patent
De Groot et al.

(10) Patent No.: US 7,890,300 B2
(45) Date of Patent: Feb. 15, 2011

(54) METHOD FOR MONITORING A FIELD DEVICE

(75) Inventors: Vincent De Groot, St. Louis (FR); Philipp Zumoberhaus, Therwil (CH)

(73) Assignee: Endress + Hauser Process Solutions AG, Reinach (CH)

( * ) Notice: Subject to any disclaimer, the term of this patent is extended or adjusted under 35 U.S.C. 154(b) by 0 days.

(21) Appl. No.: 10/560,345

(22) PCT Filed: Jun. 9, 2004

(86) PCT No.: PCT/EP2004/006216

§ 371 (c)(1),
(2), (4) Date: Jun. 7, 2006

(87) PCT Pub. No.: WO2004/109411

PCT Pub. Date: Dec. 16, 2004

(65) Prior Publication Data
US 2006/0241913 A1    Oct. 26, 2006

(30) Foreign Application Priority Data
Jun. 11, 2003    (DE)    ............... 103 26 665

(51) Int. Cl.
*G06F 11/30*    (2006.01)
*G06F 17/00*    (2006.01)
(52) U.S. Cl. .................. 702/188; 702/187; 700/79; 700/80
(58) Field of Classification Search .......... 702/188, 702/187
See application file for complete search history.

(56) References Cited

U.S. PATENT DOCUMENTS

| | | | | |
|---|---|---|---|---|
| 6,209,090 B1 * | 3/2001 | Aisenberg et al. | ........... | 713/178 |
| 6,553,497 B1 * | 4/2003 | Challener et al. | ............. | 726/23 |
| 6,618,745 B2 * | 9/2003 | Christensen et al. | ........ | 709/201 |
| 6,757,714 B1 * | 6/2004 | Hansen | ........................ | 709/206 |
| 6,774,786 B1 * | 8/2004 | Havekost et al. | ............. | 340/517 |
| 6,968,292 B2 * | 11/2005 | Boyer | .......................... | 702/182 |
| 7,069,452 B1 * | 6/2006 | Hind et al. | ...................... | 713/1 |

(Continued)

FOREIGN PATENT DOCUMENTS

DE    19855209    6/2000

(Continued)

OTHER PUBLICATIONS

Beikirch et al., "Smart field bus nodes with programmable sensor interfaces", Oct. 15-18, 2001, IEEE, Proceedings, 2001 8th IEEE International Conference on Emerging Technologies and Factory Automation, 2001, vol. 2, pp. 683-686.*

(Continued)

*Primary Examiner*—Hal D Wachsman
(74) *Attorney, Agent, or Firm*—Bacon & Thomas, PLLC

(57) ABSTRACT

A method for monitoring a field device connected via a data bus with a control unit. To prevent unauthorized tampering with the field device, the control unit requests, at intervals of time, an individual identifier of the field device. The requested individual identifier is compared with an identifier stored in the control unit. An alarm is produced or a warning, in the case of a change in the requested individual identifier.

13 Claims, 2 Drawing Sheets

U.S. PATENT DOCUMENTS

| | | | |
|---|---|---|---|
| 7,072,987 B2 * | 7/2006 | Jurisch et al. | 709/249 |
| 2002/0080938 A1 * | 6/2002 | Alexander et al. | 379/106.01 |
| 2003/0144746 A1 * | 7/2003 | Hsiung et al. | 700/28 |
| 2003/0163704 A1 * | 8/2003 | Dick et al. | 713/178 |
| 2004/0025036 A1 * | 2/2004 | Balard et al. | 713/189 |
| 2004/0107345 A1 * | 6/2004 | Brandt et al. | 713/171 |
| 2004/0129312 A1 * | 7/2004 | Cuzzo et al. | 137/296 |
| 2005/0071522 A1 * | 3/2005 | DeGroot | 710/15 |

FOREIGN PATENT DOCUMENTS

| | | |
|---|---|---|
| DE | 10017182 | 10/2001 |
| WO | WO 0131407 | 5/2001 |
| WO | WO 01/90829 A3 * | 11/2001 |
| WO | WO 0190829 | 11/2001 |

OTHER PUBLICATIONS

Translation of WO 01/31407 A2.*

* cited by examiner

METHOD FOR MONITORING A FIELD DEVICE

FIELD OF INVENTION

The invention relates to a method for monitoring a field device used in automation technology.

BACKGROUND OF THE INVENTION

In process automation technology, field devices are often used for the registering and/or influencing of process variables. Examples of such field devices are fill level measuring devices, mass flow measuring devices, pressure and temperature measuring devices, pH-redox potential measuring devices, conductivity measuring devices, etc, which, as sensors, register the corresponding process variables fill level, flow rate, pressure, temperature, pH-value and conductivity.

Besides such measuring devices, systems are also known, which, along with the measuring function, also perform other tasks; examples that can be named here are electrode cleaning systems, calibration systems, and sample takers.

Also referred to as field devices are input/output units, so-called remote I/Os.

Serving for the influencing of process variables are field devices referred to as actuators, e.g. valves, which control the flow rate of a liquid in a section of pipeline, or pumps, which influence fill level in a container.

The firm ENDRESS+HAUSER® manufactures and sells a large number of such field devices.

Field devices in modern manufacturing plants are frequently connected with superordinated units, e.g. control systems or control units, via a field bus system (PROFIBUS®, FOUNDATION®-fieldbus,HART®, etc.). These superordinated units serve for process control, process visualization, process monitoring, as well as for operating and monitoring of the field devices. From the superordinated units, communication connections to further company networks are also possible.

For operating field devices, corresponding operating programs (operating tools) are required in the control system, or in the control unit, as the case may be. These operating programs can run independently or they can be integrated into control-system applications.

The sensors deliver measured values corresponding to the current value of the registered process variable. These measured values are forwarded to a control unit, e.g. a PLC (programmable logic controller).

As a rule, process control occurs from the control unit, where the measured values of different field devices are evaluated and, on the basis of the evaluation, control signals for the corresponding actuators are produced. Besides pure, measured value transmission, field devices can also transmit additional information (diagnosis, status, etc.). Parametering and configuring of the field devices occurs, likewise, via the field bus system.

The field bus system is referred to also as the process control system.

Requirements for safety in process control systems are becoming ever stricter. Therefore, in many enterprises, process control systems are strictly separated from other company networks (SAP, business). In this way, unauthorized access to field devices is to be prevented. At the moment, efforts are being concentrated on safety in process control systems at the network level.

For preventing intrusions from outside the company, so-called firewalls are used. Besides intrusions from outside of the company, likewise dangerous are unauthorized intrusions from within a company. In the case of company-internal intrusions, e.g. parameters can be changed in the field devices, or the entire control strategy can be changed. This can lead to undesired changes in the production process.

A control strategy can be produced e.g. with the Field-Care® system of the firm Endress+Hauser and loaded into the field devices.

Programs, which enable parametering, configuring and a changing of the control strategy (SCADA-systems or configuration tools) are usually equipped with a password protection. In such case, also an authorizing of the personnel who perform changes is necessary.

For example, in the case of the CENTUM® CS 1000 process control system of Yokogawa, critical function blocks, which run e.g. in field devices, can only be changed via input of two pass words of different persons.

In the case of the firm Endress+Hauser, safety protection against unauthorized changing of parameters in field devices is provided by a locking. The person who wants to make changes must input a code at the field device, before changes in the field device become possible.

Field devices used in process control systems normally are equipped with microprocessors and accompanying peripheral components.

Therefore, it is not possible to exclude the possibility that hardware, or software, or even just parts thereof, might be replaced, or changed, in a field device without authorization. A tampering of this kind would not be recognized by a process control system. Yet, measures such as these represent a significant intrusion into the process flow, or control strategy. Especially also for reasons of laws and regulations, it is important for a plant operator that a tamper-safe process flow be assured.

SUMMARY OF THE INVENTION

An object of the invention, therefore, is to provide a method for field device monitoring that does not enable unauthorized tampering with field devices.

This object is achieved by a method which utilizes a control unit which requests, at intervals of time, an individual identifier of the field device and compares this with an identifier stored in the control unit.

An essential idea of the invention is that a control unit, which is connected with the field device via a field bus, requests, at intervals in time, an individual identifier of the field device and compares this with an identifier stored in the control unit. By this query, a replacement of the hardware, or software, or parts thereof, is immediately noticed. The method of the invention is especially significant with respect to the validatability of a plant.

In a simple manner, the individual identifier can be the serial number of the field device. In an alternative embodiment of the invention, the individual identifier can be a key in the device firmware of the field device.

One option is also to use as an individual identifier a memory-unit test sum stored in the field device.

For enabling a reliable record keeping for the plant, the requested identifier of each query is stored in a database along with a corresponding time stamp.

A sensible variation is to store the identifier in the database only when it is determined that the identifier has changed.

Since a tampering with a field device must be reported immediately to the operating personnel, when a change in the identifier of a field device is discovered, an alarm or warning is produced.

Since also operationally required changes must also be effected in the field device, alarms or incidents should only be produced, when the changes occur outside of specified maintenance time periods. Or when the maintenance was explicitly allowed/planned.

BRIEF DESRCRIPTION OF THE DRAWINGS

The invention will now be explained in greater detail on the basis of an example of an embodiment illustrated in the drawing, the figures of which show as follows.

DESCRIPTION OF THE PREFERRED EMBODIMENT

Figure 1:
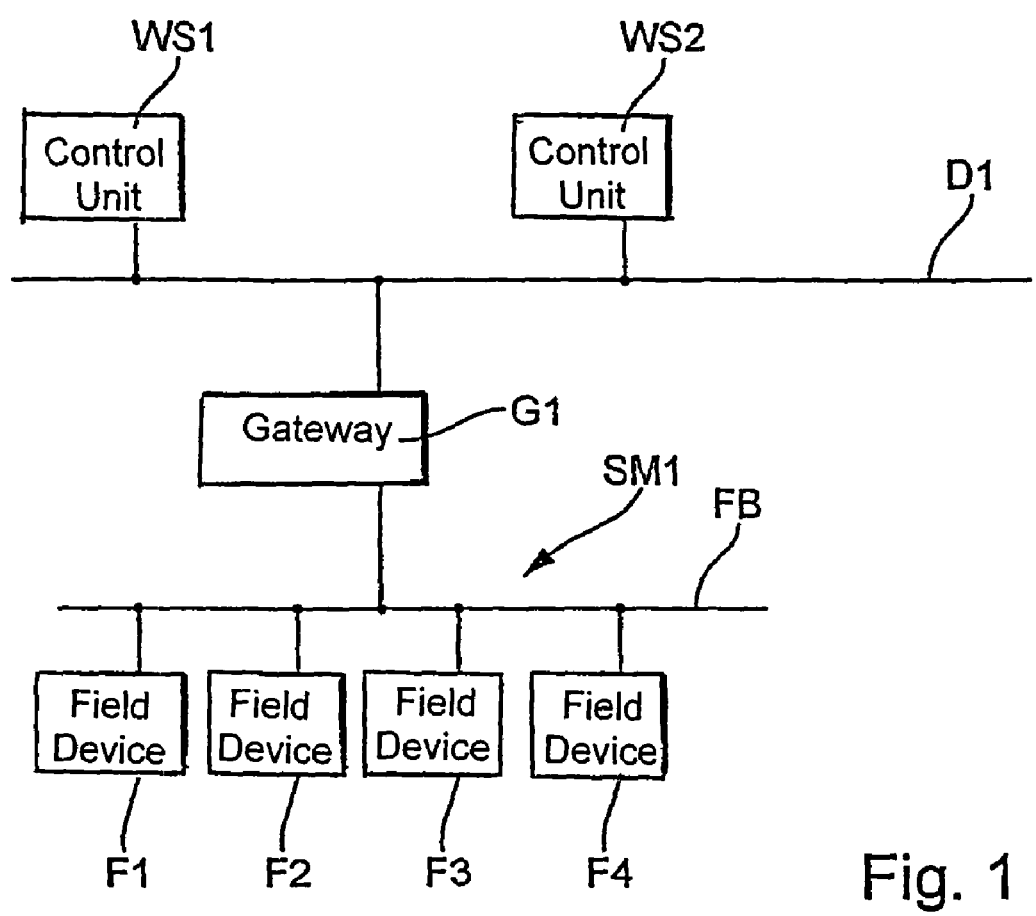
FIG. 1 is a schematic illustration of a process automation network.

FIG. 1 shows a network of process automation technology in greater detail. Connected to a databus D1 are a plurality of process control systems, or control units (work stations WS1, WS2), which serve for process visualization, process monitoring, and engineering. Databus D1 works e.g. according to the HSE (High Speed Ethernet) standard of the Foundation fieldbus. Via a gateway G1, which is also referred to as a linking device, the databus D1 is connected with a fieldbus segment SM1. The fieldbus segment SM1 is composed of a plurality of field devices F1, F2, F3, F4, which are connected together via a fieldbus FB. The fieldbus works e.g. according to the Foundation® fieldbus standard.

The method of the invention will now be explained in greater detail.

The control unit WS1 requests, at intervals in time, an individual identifier of e.g. the field device F1. Due to the query, the field device F1 sends its individual identifier to the control unit WS1. In the control unit WS1, this individual identifier is compared with an individual identifier stored in the control unit WS1. If the identifier transmitted by the field device agrees with the individual identifier stored in the control unit, then it is assured that no unauthorized tamperings have been performed with regard to the hard-, or soft-, ware, as the case may be, of the field device. In this way, a validating of the process flow is possible. Examples of individual identifiers are the serial number of the field device F1 or a key in the device software. The control unit WS1 is connected with an external database, in which each query is recorded, along with a time stamp. In this way, documentation over an extended period of time is possible.

In an alternative embodiment of the invention, storage in the database only occurs, when the control unit WS1 detects that the identifier has changed.

As a rule, maintenance work is performed in an automated plant during exactly specified periods of time. For preventing false alarms, alarms are only produced, when they lie outside of these specified periods of time for maintenance.

An alarm can be displayed at the control unit WS1 or also forwarded via alternative paths, e.g. eMail, SMS and fax, to the responsible stations.

In a very simple embodiment, it is only monitored in the control unit, whether the field device of concern, e.g. F1, is connected with the field bus and is capable of functioning. For this purpose, control unit WS1 directs a query to the field device F1, requiring an answer from the field device F1. If the field device does not answer, then the absence is stored in the database.

Figure 2:
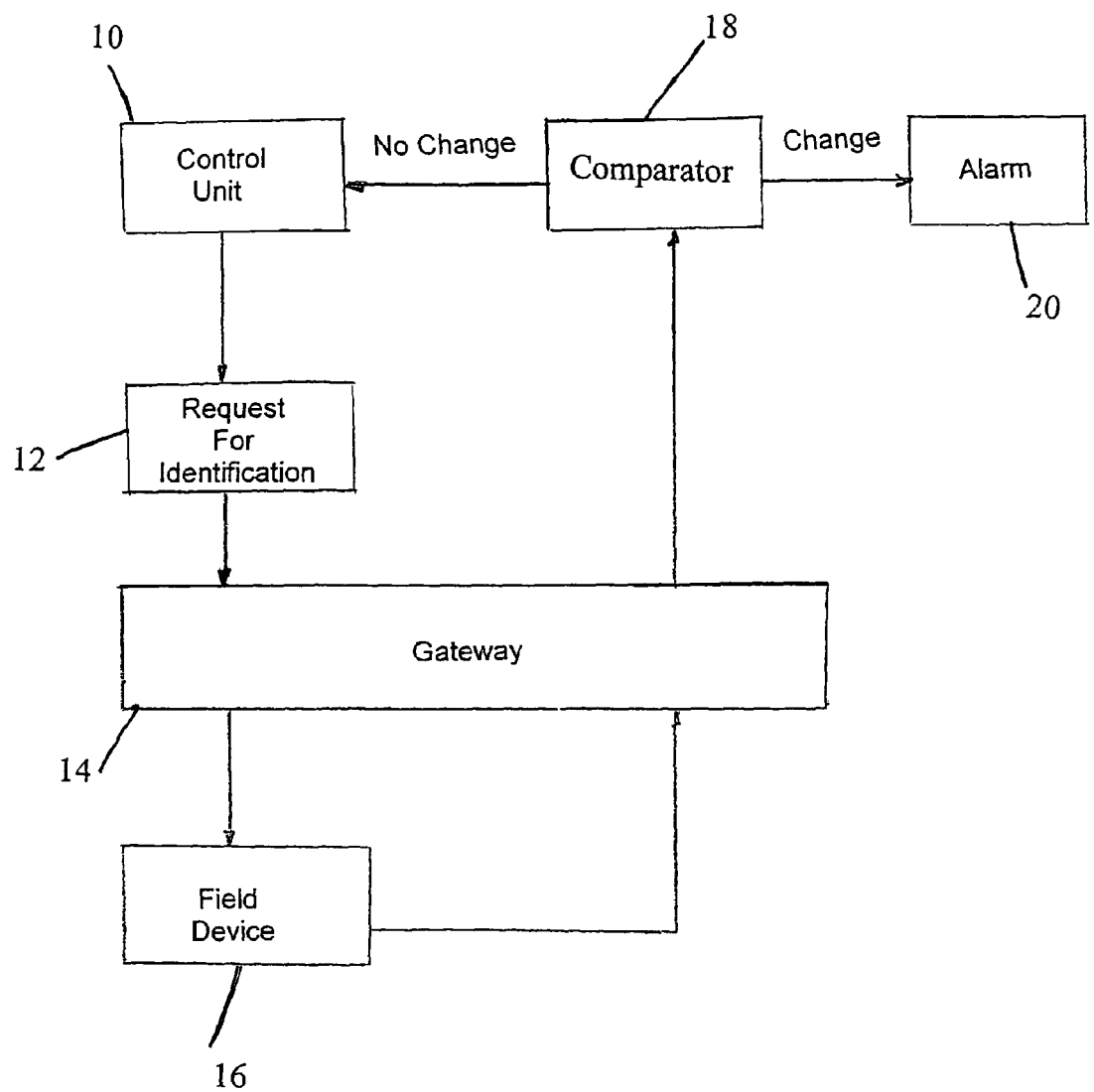
FIG. 2 is a block diagram illustrating the method of the invention.

In the block diagram of FIG. 2, there is seen a control unit 10 (WS1, for example) that initiates a request for identification 12 through the Gateway 14 (G1) to a Field Device 16 (F1, for example). A response is sent from the Field Device 16 through the Gateway 14 to a Comparator 18 (in the Control Unit, for example), which in turn renders a comparison, and engages an alarm 26 (in the Control unit, for example) if changes were detected.

The invention claimed is:

1. A method for monitoring a field device connected via a data bus with a control unit, comprising the steps of:
    using the control unit to request at intervals in time, an individual identifier of the field device;
    comparing the requested individual identifier of the field device with an identifier stored in the control unit, for indicating an unauthorized tampering with the field device based on the unauthorized replacement or change of hardware has occurred, or software, or even just parts thereof in the field device; and
    producing an alarm or a warning, in the case of a change in the requested individual identifier.

2. The method as claimed in claim 1, wherein:
    the individual identifier is the serial number of the field device.

3. The method as claimed in claim 1, wherein:
    the individual identifier is a key in the device firmware of the field device.

4. The method as claimed in 3, wherein:
    the individual identifier is a test sum of a memory unit in the field device.

5. The method as claimed in claim 1, further comprising the step of:
    storing the requested individual identifier in a database, along with a time stamp.

6. The method as claimed in claim 5, wherein:
    a storing in the database only occurs, when a change is detected in the requested individual identifier.

7. The method as claimed in claim 1, wherein:
    the alarm or warning is only produced, when the change occurs outside of a specified time period for maintenance.

8. The method as claimed in claim 1, wherein:
    the alarm or warning is presented at the control unit.

9. The method as claimed in claim 1, wherein:
    the alarm or warning is sent in electronic form.

10. The method as claimed in claim 9, wherein:
    the electronic form is one of: email; SMS; and fax.

11. The method as claimed in claim 1, wherein:
    the alarms or warnings are retrievable at the control unit.

12. The method as claimed in claim 1, wherein:
    the alarms or warnings can be retrieved via a client.

13. The method as claimed in claim 12, wherein:
    the alarms or warnings can be retrieved via Internet Explorer.

* * * * *